Nov. 18, 1930.  T. E. SHELDRAKE  1,781,708
METHOD OF FASTENING LOOSE ENDS OF TIRE CHAINS

Filed May 15, 1928

WITNESSES:
Gerhard Boule
W. P. Merriel

INVENTOR:
Theodore E. Sheldrake,
BY
Joshua R. H. Voth
ATTORNEY.

Patented Nov. 18, 1930

1,781,708

UNITED STATES PATENT OFFICE

THEODORE E. SHELDRAKE, OF PHILADELPHIA, PENNSYLVANIA

METHOD OF FASTENING LOOSE ENDS OF TIRE CHAINS

Application filed May 15, 1928. Serial No. 277,828.

My invention relates to tire chains and in particular to a method for fastening loose ends of such chains.

Few tire chains fit the tires on which they are used due to the varying diameters of different tires of the same nominal size and the reduction in diameters of tires due to wear. This results in the chains being too long and the loose ends of their side chains rattling and sometimes striking the fenders of the vehicle as the tire revolves.

The object of this invention is to provide a simple and inexpensive device for practicing the method of securing the loose ends of a tire chain against movement relatively to the rest of the chain.

It is also well known that the cross chain sections of tire chains very often become loosened during use and when it is inconvenient to have them re-attached or new cross chains applied and that such loose cross chains are causes of great annoyance in knocking against mudguards and other parts of the vehicle. The present invention is as applicable to the restraint of such loose cross chains as to the extended overlapping ends of the said chains.

The invention comprises the method of restraining loose ends of tire chains by the use of a yielding member specifically a helical spring having snap hooks pivotally or otherwise connected therewith at opposite ends, the same being adapted to be connected between the loose ends of the chain and some other portion of the side chain which will furnish a taut link for such connection.

Figure 3:
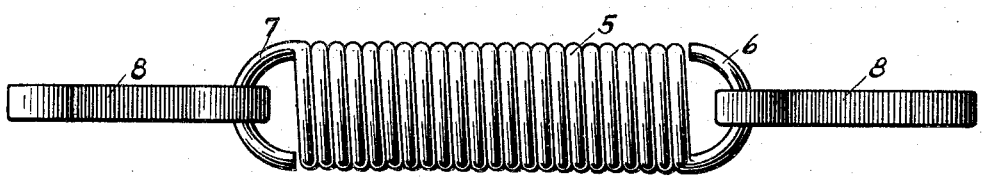

Figure 3 a side view thereof.

Figure 1:
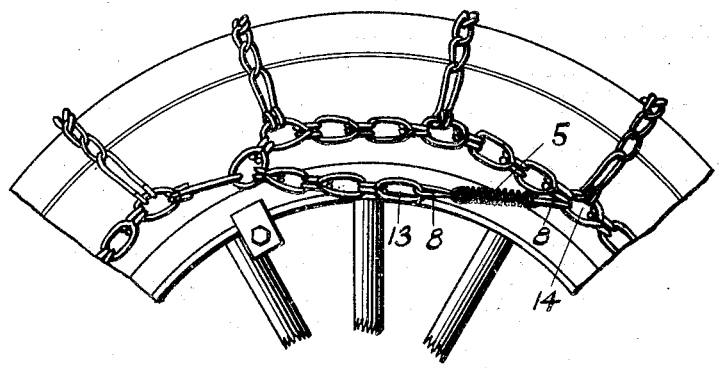
Figure 1 is a fragmentary side view of a vehicle wheel and tire having a tire chain secured thereon and showing the loose end of the chain secured against movement relatively to the chain by one of my improved devices.
Figure 2:
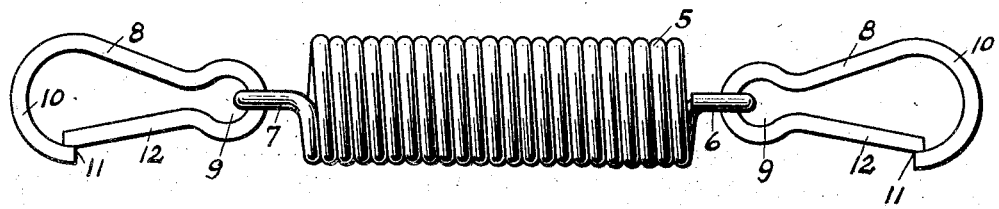
Figure 2 is a plan view of one of my improved devices.

Referring more in detail to the drawing, there is shown a device for carrying forward the method in which the body part of the device consists of a tightly coiled spring 5 preferably made of stiff spring wire and having a half turn at each end bent into a plane parallel to the axis of the spring to form eyes 6 and 7. Secured in each eye is a hook 8 bent from a single piece of spring wire to form an eyelet 9 at one end engaging the eye and a hook 10 at the other end having its entrance 11 closed by a tongue 12, as best shown in Figure 2.

In using the device, one of the hooks 8 is snapped into the end link 13 of the tire chain, spring 5 extended, and the other hook 8 snapped into a convenient link 14 of the side chain, thus holding the loose links against movement relatively to the rest of the chain.

The practice of the method of the present invention as herein described and as illustrated by the mechanical parts for carrying forward the invention may be modified in various ways without departing from the invention herein set forth and hereinafter claimed.

I claim:—

1. A tire chain having the superfluous loose end links, in combination with means for securing said links, said means comprising a resilient member having one end attached to said links and the other attached to another portion of the chain, substantially as described.

2. A tire chain having the superfluous loose end links, in combination with means for securing said links, said means comprising a coiled spring, and means on the ends of said spring for detachably engaging said loose links and another portion of the chain respectively, substantially as described.

In testimony whereof I have signed my name to this specification.

THEODORE E. SHELDRAKE.